Patented Aug. 9, 1949

2,478,834

UNITED STATES PATENT OFFICE 2,478,834

PROCESS OF MAKING THE DISODIUM SALT OF 2-CARBOXY-PHENYL-SULFURIC ACID

Jacques Parrod, Paris, and Victor Armand, Montrouge, France, assignors to Societe Generale d'Applications Therapeutiques "Theraplix," Paris, France, a French company No Drawing. Application November 13, 1946, Serial No. 709,438. In France October 17, 1946

2 Claims. (Cl. 260—457)

The invention relates to a new arylsulfonate, viz. the disodium salt of 2 carboxy-phenyl-sulphuric acid, or sodium salicylsulphate,

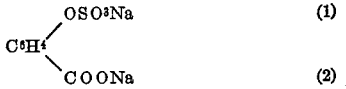

and the process of preparation thereof.

The invention is also concerned with the process of preparation of other salts of the 2.carbonphenyl-sulphuric acid.

Applicants found that salicylsulphates can be readily prepared with high yields by preparing first an alkyl salicylsulphate and saponifying the alkyl group by the base corresponding to the salt to be prepared.

The following example illustrates the manner of carrying out the invention, as applied to the preparation of the sodium salt.

Example 32 kg. of chlorosulphonic acid are poured in a 500 l. reaction vessel, provided with a stirring device and a cooling jacket. The mass is cooled down to 0° C. and 41 kg. of dimethylaniline are added in small fractions, while stirring, care being taken to keep the temperature of the mixture below 0° C. The reagents condense into dimethylaniline chlorosulphonate $$ClSO_3H + (CH_3)_2NC_6H_5 \rightarrow ClSO_3HN(CH_3)_2C_6H_5$$

Upon completion of the reaction, 38.3 kg. of methylsalicylate, previously admixed with 30.5 kg. dimethylaniline, are added in small fractions. When the reaction is completed, the temperature is allowed to rise to 30° C. while stirring is continued for several hours.

The following reaction takes place:

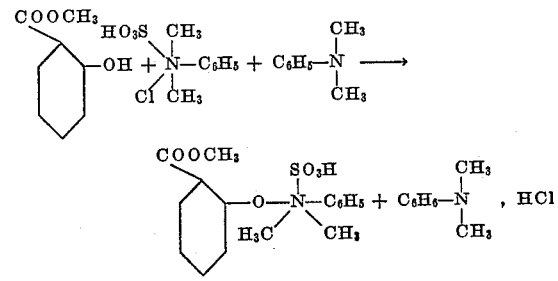

300 l. ethanol (95°) are first added to the mixture, and then 14 kg. of sodium hydroxide are added by fractions.

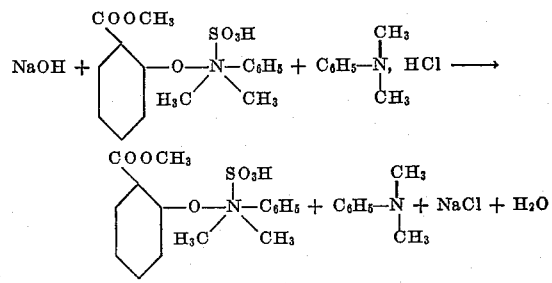

The precipitated sodium chloride is removed by centrifugation from the solution which is placed again into the reaction vessel and admixed with 21 kg. sodium hydroxide added in successive fractions. Stirring is continued for several hours.

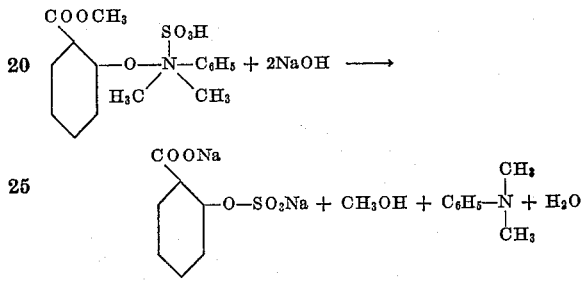

The precipitate thus formed is separated by centrifugation and purified by boiling at 95° ethanol.

Sodium salicylsulphate is a white powder, having the following characteristics:

Molecular weight: 262
M. P. not measurable, due to thermal decompositions.
Solubility in cold water: 75%
Solubility in hot water: 200%
pH of the 10% solution: 9.4.

A test with iron perchloride proves the absence of free salicylic acid.

Said product may be used for curing rheumatisms, where it advantageously replaces the salicylates, generally used; in equivalent doses, it is better tolerated by the organism.

It is conditioned, as salicylates, in various pharmaceutical forms (ampulas, tablets) at the usual doses for salicylates.

Obviously, the invention is not limited to the detail above described given solely by way of example.

Having now described our invention what we claim as new and desire to secure by Letters Patent is:

1. A process of preparing the disodium salt of 2 carboxy-phenyl-sulphuric acid, which comprises reacting chlorosulphonic acid with dimethylaniline, treating the dimethylaniline chlorosulphonate thus obtained with a lower alkylsalicylate in the presence of sufficient dimethylaniline to take up the liberated hydrochloric acid and reacting therewith sodium hydroxide in alcoholic medium to precipitate sodium chloride and saponify the alkyl salicylsulphate.

2. A process of preparing the disodium salt of 2 carboxy-phenyl-sulphuric acid, which comprises reacting chlorosulphonic acid with dimethylaniline, treating the dimethylaniline chlorosulphonate thus obtained with a lower alkylsalicylate in the presence of sufficient dimethylaniline to take up the liberated hydrochloric acid, adding sodium hydroxide in alcohol to precipitate sodium chloride, separating the latter from the liquid, adding further amounts of sodium hydroxide in alcohol to saponify the alkyl salicylsulphate and separating the disodium salt of 2 carboxy-phenyl-sulphuric acid from the liquid.

JACQUES PARROD.
VICTOR ARMAND.

REFERENCES CITED

The following references are of record in the file of this patent:

Chemical Abstracts, Loeper et al., vol. 39, page 5325, 1945.